United States Patent
Schmidt et al.

(10) Patent No.: US 9,676,422 B2
(45) Date of Patent: Jun. 13, 2017

(54) AIR GUIDE

(71) Applicant: HBPO GmbH, Lippstadt (DE)

(72) Inventors: Ralf Schmidt, Oelde (DE); Steffen Höwelkröger, Delbrück (DE); Reinhold Brückner, Herzebrock-Clarholz (DE)

(73) Assignee: HBPO GmbH, Lippstadt (DE)

( * ) Notice: Subject to any disclaimer, the term of this patent is extended or adjusted under 35 U.S.C. 154(b) by 0 days.

(21) Appl. No.: 14/783,420

(22) PCT Filed: Feb. 26, 2014

(86) PCT No.: PCT/EP2014/053766
§ 371 (c)(1),
(2) Date: Oct. 8, 2015

(87) PCT Pub. No.: WO2014/166669
PCT Pub. Date: Oct. 16, 2014

(65) Prior Publication Data
US 2016/0052559 A1 Feb. 25, 2016

(30) Foreign Application Priority Data
Apr. 9, 2013 (DE) .......................... 10 2013 103 551

(51) Int. Cl.
*B62D 25/08* (2006.01)
*B62D 29/04* (2006.01)
(Continued)

(52) U.S. Cl.
CPC ............ *B62D 25/085* (2013.01); *B60K 11/08* (2013.01); *B62D 29/04* (2013.01); *B62D 65/024* (2013.01);
(Continued)

(58) Field of Classification Search
CPC .... B62D 25/085; B62D 29/04; B62D 65/024; B60K 11/08; B60Y 2304/05; B60Y 2304/01
(Continued)

(56) References Cited

U.S. PATENT DOCUMENTS 4,061,188 A * 12/1977 Beck ...................... B60K 11/02
123/41.49
4,213,426 A * 7/1980 Longhouse ............... F01P 5/06
123/41.49
(Continued)

FOREIGN PATENT DOCUMENTS

DE  GB 469521 A  7/1937
DE  8234137  5/1983
(Continued)

OTHER PUBLICATIONS

International Search Report, mailing date Jun. 3, 2014 for corresponding International Application No. PCT/EP2014/053766 with English translation.
(Continued)

*Primary Examiner* — Jason S Morrow
*Assistant Examiner* — E Turner Hicks
(74) *Attorney, Agent, or Firm* — Intellectual Property Law Group LLP

(57) ABSTRACT

The invention relates to an air guide (10) particularly for a cooling module (12) of a front-end module (11) of a vehicle with an air guide body (20) which comprises an air inlet opening (21) and an air outlet opening (22) in order to guide air from the outside to the inside with regard to the vehicle. To this end, the invention provides that the air guide body (20) is configured from such a material (30) that the air guide body (20) can be transferred in the mounting state (I) and in the transport state (II) wherein the air guide body (20)
(Continued)

assumes a significantly greater volume in the mounting state (I) than in the transporting state (II).

18 Claims, 5 Drawing Sheets

(51) Int. Cl.
*B62D 65/02* (2006.01)
*B60K 11/08* (2006.01)

(52) U.S. Cl.
CPC ....... *B60Y 2304/01* (2013.01); *B60Y 2304/05* (2013.01)

(58) Field of Classification Search
USPC ....... 296/208, 187.09, 190.09, 193.09, 193.1
See application file for complete search history.

(56) References Cited

U.S. PATENT DOCUMENTS

| | | | | |
|---|---|---|---|---|
| 4,774,911 A | * | 10/1988 | Yamaguchi | F04D 29/646 |
| | | | | 123/41.49 |
| 5,740,766 A | * | 4/1998 | Moser | F01P 5/06 |
| | | | | 123/41.49 |
| 7,399,157 B2 | * | 7/2008 | Tonhaeuser | F01P 5/06 |
| | | | | 277/553 |
| 8,221,074 B2 | * | 7/2012 | Nelson | F04D 29/526 |
| | | | | 415/213.1 |

FOREIGN PATENT DOCUMENTS

| | | | |
|---|---|---|---|
| DE | 8234137 U1 | 5/1983 | |
| DE | 19525698 A1 | 1/1997 | |
| DE | 19826706 A1 | 12/1999 | |
| DE | EP 1243455 A2 * | 9/2002 | ............. B60K 11/08 |
| EP | 1243455 A2 | 9/2002 | |
| EP | 2028082 A1 | 2/2009 | |

OTHER PUBLICATIONS

Written Opinion of the ISA, mailing date Jun. 3, 2014 for corresponding International Application No. PCT/EP2014/053766.
International Preliminary Report on Patentability, mailing date Jun. 25, 2015 for corresponding International Application No. PCT/EP2014/053766.

* cited by examiner

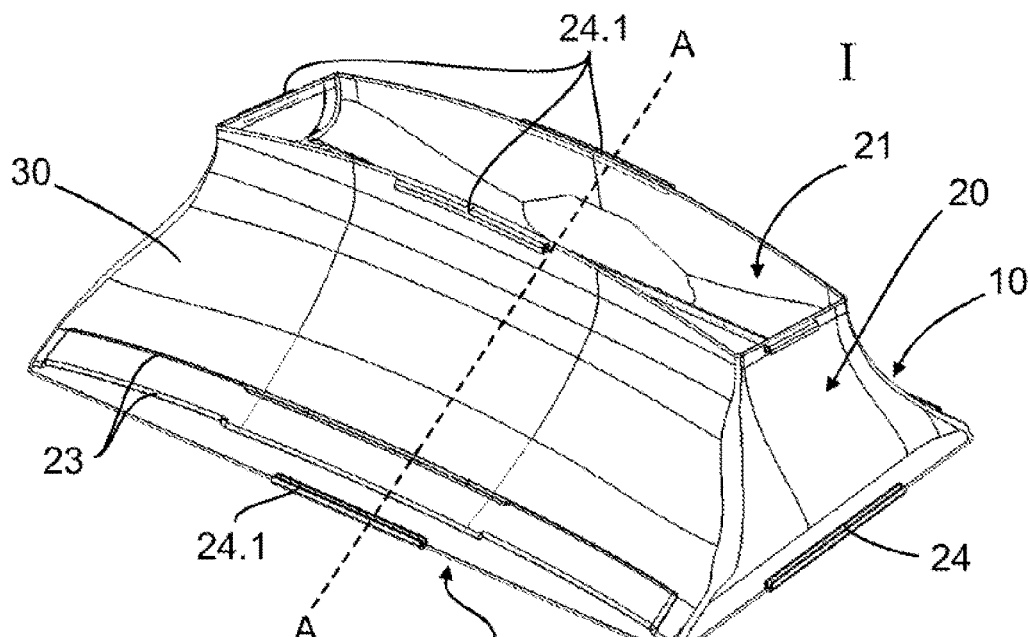
Fig. 3a
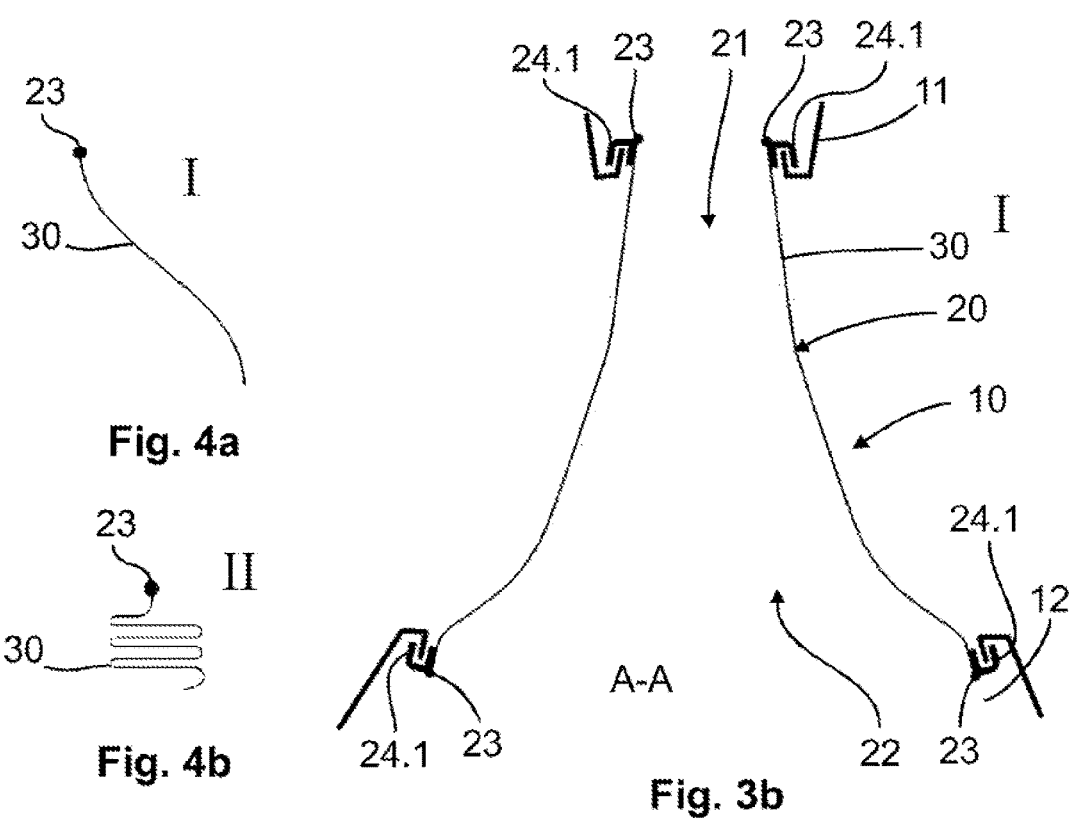
Fig. 4a
Fig. 4b
Fig. 3b

AIR GUIDE

CROSS-REFERENCE TO RELATED APPLICATIONS

This application is a U.S. National Phase application, under 35 U.S.C. §371, of International Application no. PCT/EP2014/053766, with an international filing date of Feb. 26, 2014, and claims benefit of German Application no. 10 2013 103 551.5 filed on Apr. 9, 2013, which are hereby incorporated by reference for all purposes.

BACKGROUND OF THE INVENTION

1. Field of the Invention

The invention relates to an air guide, particularly a cooling module, of a front-end module of a vehicle having an air guide body which comprises an air inlet opening and an air outlet opening in order to guide air from the outside to the inside with regard to the vehicle.

2. Background Art

In common vehicles front-end modules are assembled which comprise among others an air guide in order to direct cool air from the outside into the direction of the engine in order to cool the engine. The air guides are thereby assembled between a radiator grill at the outside of the vehicle and a cooling module on the engine side.

The air guides can thereby be configured as planar components. However, these planar components are replaced more often by three-dimensional plastic components which comprise a shell surface for forming of outside air in order to optimally direct air from the outside into the direction of the engine. The components turn out to be increasingly bulky since they require a lot of space during storage and transport. Further these plastic components require additional storage carriers in between which should protect the plastic components which are assembled one on top of the other from being compressed. After the transport of the components to the costumer the storage carriers subsequently need to go back to the producer. Therefore, these components cause especially in their transport a high effort and high costs.

SUMMARY OF THE INVENTION

The invention therefore has the object to avoid the previously described disadvantages. Particularly, it is the object of the present invention to provide an air guide which makes it possible to minimize the required storage space and to reduce the logistic cost during transport.

The object according to the invention is solved by an air guide according to the invention, by a method for mounting according to the invention and a front-end module according to the invention. Further, features and details of the invention result from the dependent claims, the description and the drawings. Thereby, features and details which are described in connection with the air guide according to the invention naturally also apply in connection with the method for mounting according to the invention and in connection with the front-end module according to the invention and vice versa, so that according to the disclosure for the single aspects of the invention it can always be reciprocally related to.

The idea of the invention is thereby that the air guide body can be configured from such a material that the air guide body can be turned into a mounting state and a transport state, wherein in the mounting state the air guide body comprises a significantly larger volume than in the transport state. Advantageously, the invention provides an air guide which now comprises a flexibly configured air guide body instead of stiff and bulky air guide bodies so that for the transport the air guide can be turned into the transport state. In the transport state the air guide assumes a significantly smaller volume so that per transport more components can be transported. Further, it is a significant advantage that in the transport state the air guide body can take shape of a plane form so that the storage volume can be used optimally. Further, the material can be chosen in a way that it can be merged and/or folded up without being damaged, so that the folded up air guidances can be stacked on top of one another without permanently damaging the components lying underneath. Thereby, advantageously storage carriers are not necessary during the storage of the air guidances. Therefore, not only the room provided for the transport can be used optimally but also the transport cost can be reduced. For mounting at a front-end module of a vehicle the air guide body can be subsequently reconverted in the mounting state.

According to the present invention the material can be chosen as a textile. The textile advantageously is a thin, light and flexible material wherein the weight of the air guide is advantageously reduced. According to the invention therefore the air guide body can be reversely turned into the transport and into the mounting state without damaging the material. Further, this flexible textile makes a compact and efficient transport of the air guide possible. The air guide can be configured differently and assume several different forms by use of flexible textile. Therefore, the textile can comprise corresponding cuttings and seams. The advantage of the air guide according to the invention is therefore that the air guide can be configured for different vehicle models. Further, the material can be produced simply and cost-effectively. For example the textile can be a technical textile.

Advantageously, the material can be configured from synthetic polymers, particularly from polyester, polyamide, polyimide, polyethylene, polypropylene, elastane, nylon or such like. Advantageously, these materials from synthetic polymers are characterized by a high resistance, stiffness and resilience. They can be efficiently processed and are cost-effective. Further, materials from synthetic polymers can be easily provided with flexible properties and can be produced in desired forms. Due to this the plastic textiles are particularly suitable for producing differently configured air guides for different vehicle models.

Further, the material can be configured from natural fibres or natural polymers, particularly from cotton, linen, viscose, modal, rubber or such like. The materials from natural fibres or natural polymers are advantageously carbon neutral. The released carbon during burning of these materials is at least partially bound from the atmosphere during growth of the raw materials like plants or wood. These materials can be processed in an environmental friendly manner and can be produced from renewable resources. Further, the materials from natural fibres or natural polymers are tear-resistant, deformable and light.

The material according to the invention can advantageously be configured in a way that it is impermeable to air and/or water repellent and/or foldable that the air guide like air impermeability and water repellence can be realized. Thereby, the impermeability of air is important for the air guide in order to avoid that cool air from the outside is not mixed with waste heat of the engine. Therewith, the air guide according to the invention can hermetically close the engine compartment so that no warm air can reach the engine for cooling. The water repellent property helps to provide a desired sealing between the outer area of the vehicle and the engine compartment by the air guide so that moisture and dirt from the outside can not reach the engine. The foldable material can advantageously serve to reversibly transfer the air guide in the mounting and in the transport state without damaging the material.

According to a particular advantage the air guide can comprise a reinforcement structure. Advantageously, the reinforcement structure can be more stable than the material. Thereby, it is possible that the reinforcement structure can be configured from hard plastic and/or light metal and/or glass fibre or such like. Advantageously, the reinforcement structure can stretch the material in the mounting state in order to achieve a required geometric form of the air guide which is suitable to optimally guide the air. Further, the reinforcement structure can serve for keeping the form or the shell surface of the air guide body stable during operation. Further, the reinforcement structure can serve for adjusting the geometric form of the air guide at existing geometries of different engine compartments. Further, it can be particularly advantageous that the reinforcement structure can be configured in a way that the air guide can be established and refolded according to the telescope or tent principle. Consequently, the air guide can be simply turned into the mounting state and/or the transport state. The assembly and the mounting of the air guide according to the invention can thereby be significantly simplified.

According to the invention it is possible that the reinforcement structure can be integrated in the material. The reinforcement structure can advantageously be weaved in the material and/or can be connected with the material in the form and/or force fitting and/or in a materially bond manner and/or can be clamped or clipped at the material. Alternatively or additionally it is possible that the reinforcement structure can be at least partially built by the material itself. Therewith the weight of the air guide can be reduced and the production can be further simplified. The reinforcement structure can advantageously configure a skeleton or a frame for the air guide body in order to achieve the desired form of the air guide.

Advantageously, the reinforcement structure can comprise the reinforcement elements in or at the air guide body, particularly at the air inlet opening or at the air outlet opening. The reinforcement elements according to the invention can thereby configure the necessary joints and/or connection and/or corner and/or end caps of the air guide in order to transmit the air guide from the transport state into the mounting state and to stabilize the air guide in the mounting state. The reinforcement elements can therewith advantageously serve for realizing the telescope or tent principal during assembly or folding of the air guide. Thereby, it is possible that the air guide according to the invention can comprise at least two reinforcement elements at the air inlet opening or at the air outlet opening which can further serve to assemble the air guide at the vehicle.

Advantageously, the reinforcement elements can comprise corner elements and/or rods and that particularly the corner elements can be configured from hard plastic and/or the rods from glass fibre or from light metal. The corner elements can thereby serve for keeping the form of the air guide and the rods for stretching the material. The reinforcement elements can advantageously be configured as standardised components which can serve for establishing the air guides in different forms.

According to a further advantage of the invention the reinforcement elements can be adjusted mainly in the direction of the air outlet opening to the air inlet opening and/or transversely to that. Therewith, the reinforcement elements can optimally configure a frame for stretching the material. Alternatively, it is possible that the air guide only comprises the reinforcement elements which are adjusted in the direction of the air outlet opening to the air inlet opening or only transversely to that. Thereby, it can be advantageous that the reinforcement elements can comprise joints in order to receive a minimal volume of the air guide in an assembled transport state and/or to confer the particular form of the air guide with curved lines in the assembled mounting state.

Advantageously, the reinforcement elements can be exchangeable and/or firmly integrated in the material. Exchangeable reinforcement elements can advantageously serve for realizing the air guide in form of a construction kit system wherein the same reinforcement elements can serve for forming air guides in different configurations.

The invention further advantageously intends that the air guide body can comprise attachment elements in order to attach the air guide at the vehicle in a form and/or force fitting manner. The attachment elements can be configured more stably than the material. Hereby, the attachment elements can serve to assemble the air guide with the air inlet opening at the opening in the vehicle body outer component or at the front-end module of the vehicle and with the air outlet opening at the cooling module. The attachment elements can further serve for sealing the opening in the vehicle body outer component or in the front-end module so that the air from the outside can only reach the cooling module via the air guide. Further, the attachment elements can serve for sealing the space between the cooling module and the engine cooling circulation in order to avoid that the warm air can be mixed with the air from the outside and reach the engine.

The attachment elements can thereby be connected with the material in a form and/or force fitting or material bonding manner or can be integrated in the material. Therewith, the attachment elements can be configured as parts of the air guide. The attachment elements can advantageously serve for receiving a stable form of the air guide. Further, the attachment elements can serve as stable grab elements during stretching of the material in order to facilitate the mounting of the air guide. Further, the attachment elements can serve for at least partially defining the air inlet opening and the air outlet opening. Thereby, it is possible that the attachment elements can be configured in form of latching and/or clip elements or hooks or screws in order to assemble the air guide at the vehicle. By the attachment elements according to the invention it can be achieved that the air guide according to the invention can be dismantled from the vehicle or front-end module for reasons of maintenance of the cooling or other front-end components and can be easily reassembled again.

The object according to the invention is further solved by a method for mounting of an air guide like it is previously described at the front-end module of the vehicle comprising the following steps:

transfer of the air guide from a transport state into a mounting state wherein the air guide assumes a significantly greater volume in the mounting state than in the transport state, mounting of the air guide at the front-end module wherein the steps can be configured in any order.

Advantageously, the invention enables that the air guide can be easily and quickly assembled and can be detachably attached at the vehicle. The air guide according to the invention can thereby be used instead of rigid and bulky air guide bodies in order to assemble flexibly configured air guide bodies. The air guide according to the invention can be transported in the transport state in which the air guide assumes a significantly smaller volume than in the mounting state. For the assembly at the vehicle the air guide can firstly be transferred into the mounting state. Thereby, the air guide can be stretched so that the air guide can build a stable air guide body in a certain form with an air inlet opening and an air outlet opening. Subsequently, the air guide can be mounted from one side at the front-end module or bumper of the vehicle and from the other side at the cooling module. Alternatively, it is possible that the air guide in the assembled state can be mounted at the front-end module or at the cooling module from one side and can only then be stretched. Subsequently, the air guide can be assembled from the other side at the cooling module or at the front-end module.

Further, the invention solves the object according to the invention by the use of a material for an air guide particularly for a cooling module of a front-end module of a vehicle. Therefore, it is intended according to the invention that the material is configured in a way that the air guide can be turned in a mounting state and in a transport state wherein the air guide assumes a significant greater volume in the mounting state than in the transport state.

Further, the object according to the invention is solved by a front-end module of a vehicle with a previously described air guide which can be mounted at a front-end module of a vehicle according to a method according to the invention.

BRIEF DESCRIPTION OF THE DRAWINGS

According to the invention the features of the description and the claims of the air guide according to the invention, the method for mounting according to the invention and the front-end module according to the invention can be each single for themselves and also in any combination be essential for the invention. Further, the invention improving measures are subsequently described in detail together with the description of the preferred embodiments of the invention by means of the drawings. It is shown:

FIG. 1a a schematic representation of a common front-end module of a vehicle with an air guide and a cooling module in an exploded view, FIG. 1b a schematic drawing of a front-end module of FIG. 1a in an assembled state, FIG. 2a a schematic drawing of a front-end module according to the invention of a vehicle with an air guide according to the invention and a cooling module in a mounting state, FIG. 2b a schematic drawing of a front-end module of FIG. 2a with an air guide according to the invention in a transport state, FIG. 3a an example of an embodiment of an air guide according to the invention in a perspective drawing, FIG. 3b a schematic drawing of an air guide of FIG. 3a in a sectional view A-A, FIG. 4a a schematic drawing of the air guide in the mounting state, FIG. 4b a schematic drawing of the air guide in the transport state, FIG. 5a an example of an embodiment of the air guide according to the invention in a perspective drawing, FIG. 5b an enlarged drawing of a part of the air guide of FIG. 5a, FIG. 6a an example of an embodiment of the air guide according to an invention in a perspective drawing, FIG. 6b an enlarged drawing of a part of the air guide of FIG. 6a.

DETAILED DESCRIPTION OF SPECIFIC EMBODIMENTS

Figure 1A:
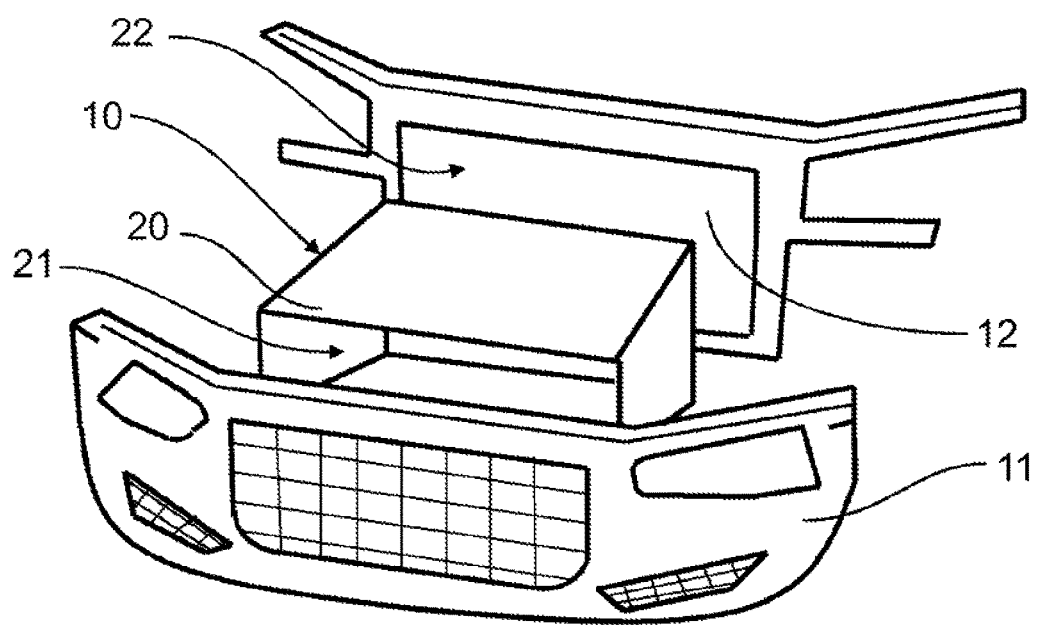
Figure 1B:
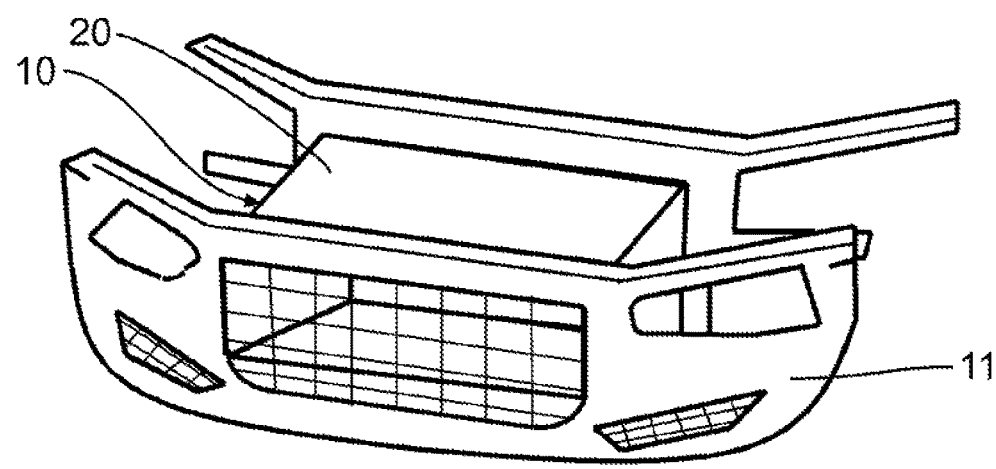

FIG. 1 shows a common front-end module 11 which can be assembled at the front of a vehicle. On the engine side of the vehicle a cooling module 12 is established. Between the so called radiator grill of the front-end module 11 and the cooling module 12 an air guide 10 is positioned in order to guide cool air from the outside into the direction of the cooling module 12 and to cool the engine behind the cooling module 12. Common air guides 10 comprise a rigid air guide body 20 for forming the outside air which comprises an air inlet opening 21 towards the outside and an air outlet opening 22 into the direction of the engine. Such known air guides 10 are configured bulky and need a lot of space during storage and transport.

Figure 2A:
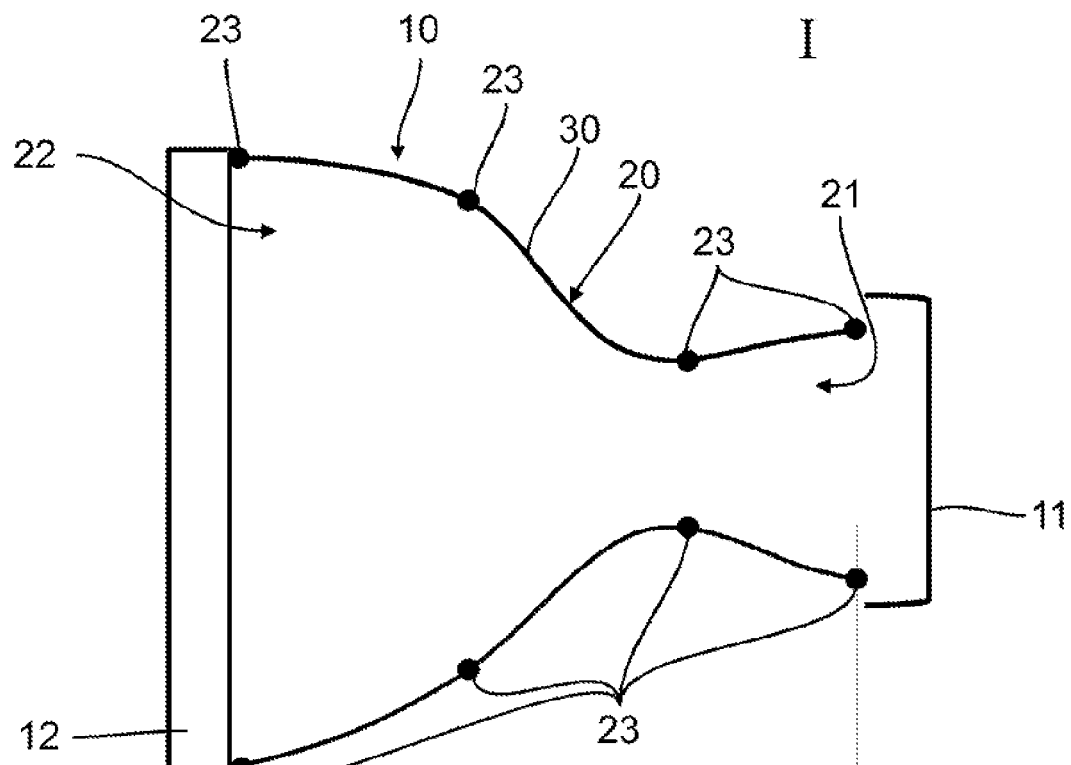
Figure 2B:
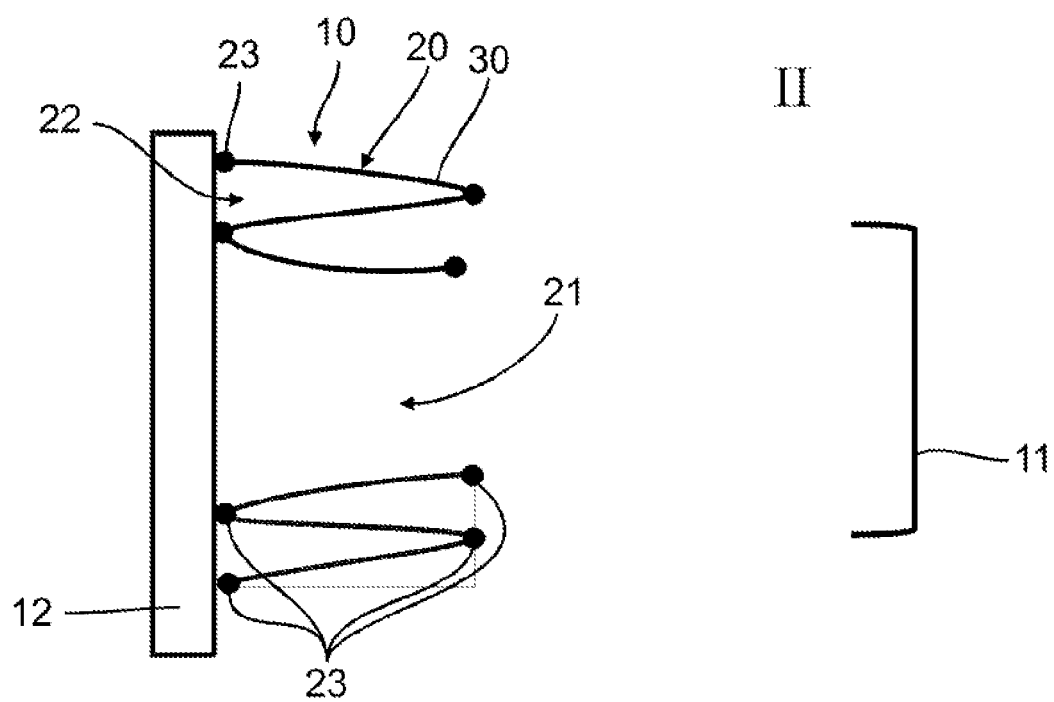
Figure 5A:
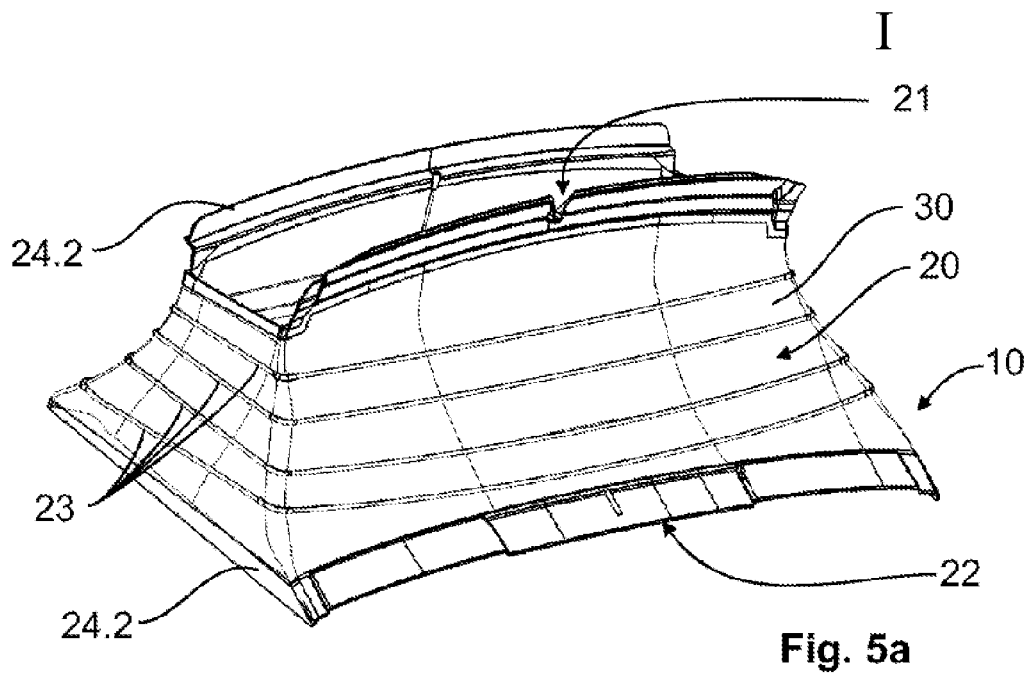
Figure 5B:
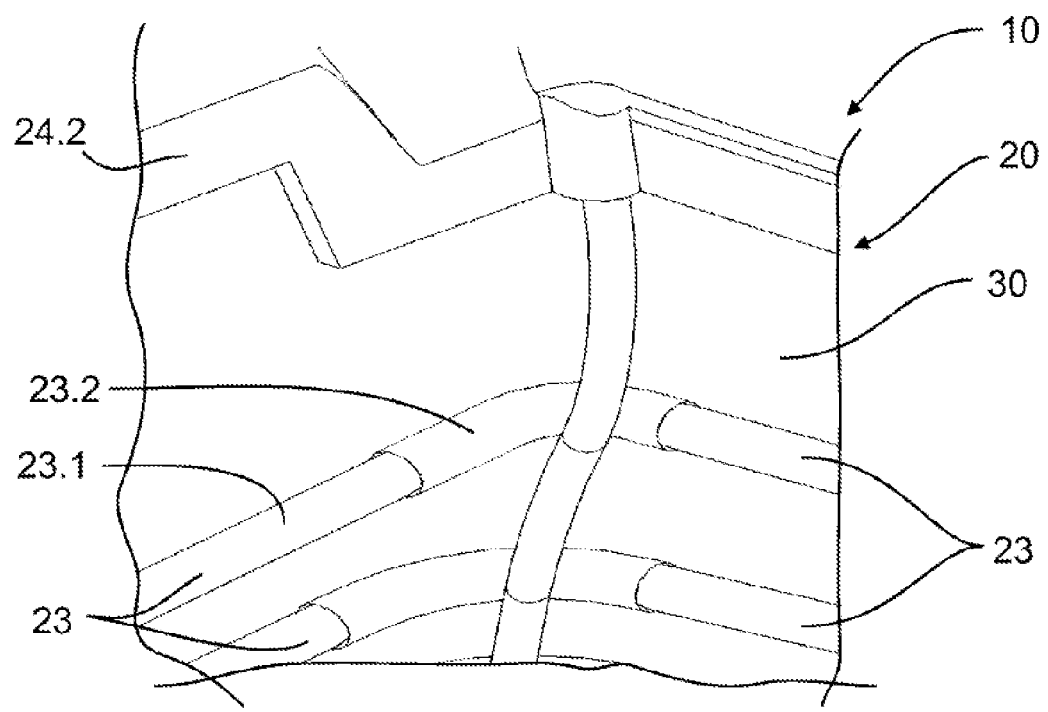
Figure 6A:
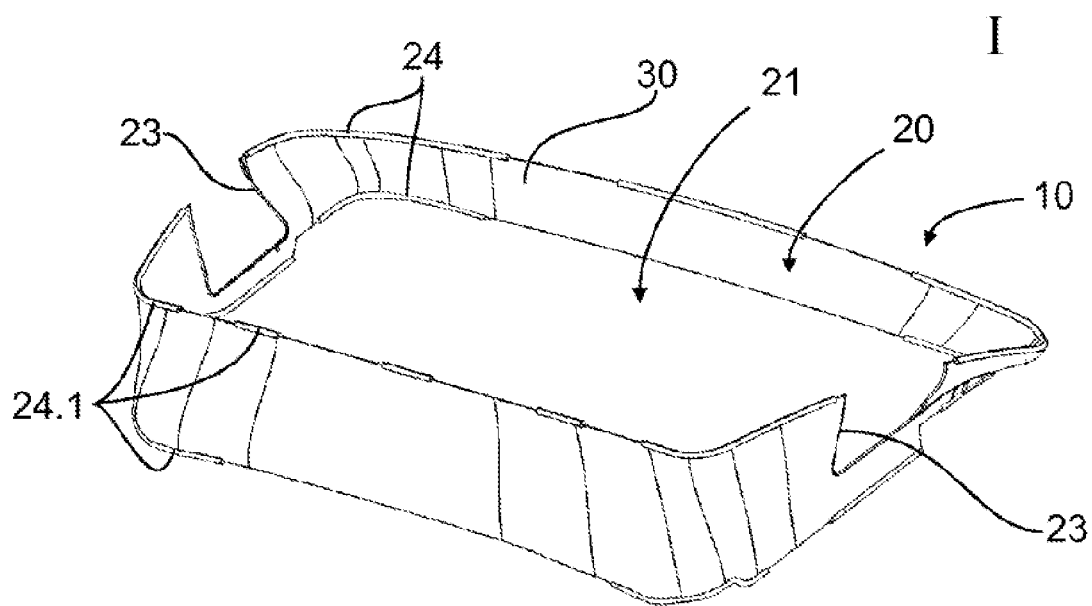
Figure 6B:
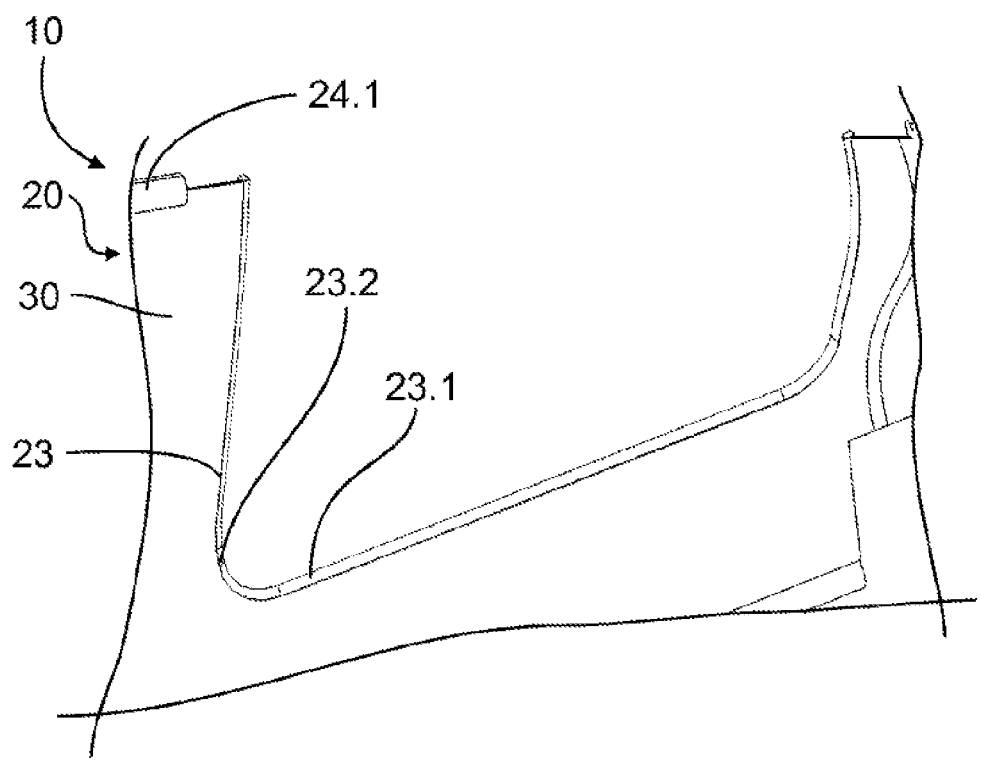

In order to improve known air guides 20 the invention proposes to configure the air guide body 20 like shown in FIGS. 2a and 2b. The air guide 20 according to the invention is thereby configured from such a material 30 which makes it possible to transfer the air guide body 20 from a mounting state I of FIG. 2a in a transport state II of FIG. 2b in which the air guide body 20 comprises a significantly smaller volume than in the mounting state I. The advantage of the invention is thereby that the air guide 10 receives the flexible air guide body 20 according FIGS. 2a to 6b which can be folded for transport without being damaged instead of a bulky air guide body 20 of FIGS. 1a and 1b. Therefore, more components can be transported per badge and the transport costs can be reduced. For mounting at the front-end module 11 and at the cooling module 12 the air guide body 20 can be transferred in the mounting state I again after transport. According to the invention the air guide 20 can be reversibly turned in the mounting state I and in the transport state II.

According to the invention the material 30 can for example be a technical textile. The textile has the advantage to be cost-efficient in its production, to comprise a low weight and be flexible. Due to this the air guide 20 according to the invention can be applied in different vehicle models. The material can according to the invention be configured from synthetic and also from natural polymers and even from natural fibres. By the suitable choice of the material 30 the essential properties of the air guide 10 can be provided like air impermeability in order to avoid that warm air can reach the engine via the air guide 20 and water repellence in order to protect the engine compartment from environmental influences like moisture and dirt.

According to the invention the air guide 20 can comprise a reinforcement structure 23 which is harder than the material 30 in order to confer a desired aerodynamic form of the air guide 20 for forming the air. The reinforcement structure 23 is shown in the examples of the embodiments from FIGS. 2a to 6b. It can be configured from hard plastic, light metal, glass fibres or such like. The reinforcement structure 23 helps to stretch the material 30 in the mounting state I in order to achieve an optimal geometric form of the air guide 20. Further, the reinforcement structure 23 serves for stabilizing the shell surface of the air guide body 20. By the flexible material and the suitable reinforcement structure 23 the air guide 10 can be configured in different geometries like shown in FIGS. 3a, 5a and 6b. Further, the reinforcement structure 23 configures a skeleton of the air guide 10 so that the air guide 10 can be folded or assembled according to a telescope principle like shown in FIGS. 2b, 4a and 4b.

The assembly and the mounting of the air guide 10 according to the invention are therewith significantly simplified. The reinforcement structure 23 can on the one hand be integrated in the material 30 for example weaved, glued directly at the material 30 or be at least partially configured by the material 30 itself.

The reinforcement structure 23 can comprise reinforcement elements 23.1 and 23.2 in or at the air guide body 20. The reinforcement elements 23.1 and 23.2 can thereby determine the air inlet opening 21 and the air outlet opening 22 like shown in FIGS. 2a to 4b. According further possible embodiments of the air guide 10 the reinforcement elements 23 according to the invention can comprise corner elements 23.2 and rods 23.1 according to FIGS. 5a and 5b. The corner elements 23.2 can for example be configured from hard plastic and can comprise openings for receiving of rods 23.1 which can be for example be configured from glass fibre or from light metal. The corner elements 23.2 serve according to FIGS. 4a and 4b for keeping the form of the air guide 10 and the rods 23.1 for stretching the material 30. Together the reinforcement elements 23 can establish a skeleton or a frame of the air guide 10 in a certain form by which the material 30 is stretched. The reinforcement elements 23 according to the invention thereby configure circular elements which extend vertically to the direction from the air outlet opening 22 to the air inlet opening 21 with a decreasing extent. The reinforcement elements 23 can thereby contribute to create the telescope principle during folding of the air guide 10. Alternatively, it is possible that the reinforcement elements 23 extend in the direction of the air outlet opening 22 to the air inlet opening 21. Then the reinforcement elements 23 could be equipped with joints in order to be able to fold the air guide 10 in the transport state II.

According to FIGS. 2a and 2b the reinforcement elements 23 can further serve for the assembly of the air guide 10 at the vehicle. According to FIGS. 6a and 6b the reinforcement elements 23 can configure openings for passing through of a bumper. Further, the reinforcement elements 23 can be exchangeably integrated at the material. Thereby, the reinforcement elements 23 can for example be inserted in weaved openings in the material 30. Alternatively, the reinforcement elements 23 can be directly glued or welded at the material 30. Exchangeable reinforcement elements 23 can thereby advantageously serve for providing the air guide 10 in form of a construction kit system in order to flexibly assemble air guides 10 for different vehicles.

The air guide body 20 according to FIGS. 3a, 3b, 5a to 6b further comprises attachment elements 24 in order to attach the air guide 10 with the air inlet opening 21 at an opening at the vehicle body outer part or at the front-end module 11 and with the air outlet opening 22 at the cooling module 12. The attachment elements 24 can further act sealingly in order to avoid that dirt ends up in the engine compartment. The attachment elements 24 according to FIG. 3b can be directly glued or welded at the material 30. The attachment elements 24 according to FIGS. 5a and 5b can be clipped or clamped at the material 30 or can even be weaved in the material 30. The attachment elements 24 can likewise contribute to keeping a stable form of the air guide 10 in the mounting state I. Further the attachment elements 24 can help for grabbing during stretching of the material 30 in order to facilitate the mounting of the air guide 10. According to FIG. 5a the attachment elements 24 in form of plastic frames 24.2 can serve for at least partially defining the air inlet opening 21 and the air outlet opening 22. The attachment elements 24 according to FIG. 3b are configured in form of clamp elements or hooks in order to assemble the air guide 10 at the front-end module 11 and at the cooling module 12 in a material bonded and/or a force fitting manner. The mounting of the air guide 10 at the vehicle can thereby be configured easily and conveniently.

The air guide 10 according to the invention can as shown in FIG. 2b be assembled firstly at the cooling module 12 in the transport state II and only then like shown in FIG. 2a be stretched in the mounting state I. Alternatively, the air guide 10 can be assembled firstly in the transport state II at the front-end module 11 and only then can be stretched in the mounting state I. Further it is possible that the air guide 10 can be transferred firstly in the mounting state I and only then can be assembled at the vehicle.

The air guide 10 according to the invention can advantageously be established simply and fast and can be suitable for different vehicle models. The attachment elements 24 from FIGS. 3a, 3b and 5a to 6b and the reinforcement elements 23 from FIGS. 2a to 6b can be combined in any combination in order to provide the air guide 10 in form of a construction kit system for different vehicles. All features and/or advantages from the claims, the description and the drawings including constructive details and spacial arrangements can be essential for the invention separately for themselves or in any combination particularly based on FIGS. 2a to 6b.

REFERENCE LIST

10 Air guide
11 Front-end module
12 Cooling module
20 Air guide body
21 Air inlet opening
22 Air outlet opening
23 Reinforcement structure, reinforcement elements
23.1 Rods
23.2 Corner elements
24 Attachment element
24.1 Latching, clip elements, hooks
24.2 Plastic frame
30 Material
I Mounting state
II Transport state

The invention claimed is:

1. Air guide for a cooling module of a front-end module of a vehicle with an air guide body which comprises an air inlet opening and an air outlet opening in order to guide air from the outside to the inside with regard to the vehicle, wherein
the air guide body is flexibly configured from such a material that the air guide body can be reversibly transferred into a mounting state and into a transport state, wherein the air guide body assumes a significantly greater volume in the mounting state than in the transport state,
wherein the air guide body comprises a reinforcement structure which is more stable than the material,
wherein the reinforcement structure is at least integrated in the material or is built by the material,
wherein the reinforcement structure comprises reinforcement elements in or at the air guide body, and
wherein the reinforcement elements comprise rods.
2. The air guide according to claim 1,
wherein the material is a textile.

3. The air guide according to claim 1,
wherein the material is configured from synthetic polymers.

4. The air guide according to claim 1,
wherein the material is configured from natural fibres or polymers, particularly from cotton, linen, viscose, modal, or rubber.

5. The air guide according to claim 1,
wherein the material is at least air resistant or water repellent or foldable.

6. The air guide according to claim 1,
wherein the reinforcement structure comprises reinforcement elements at the air inlet opening or at the air outlet opening.

7. The air guide according to claim 1,
wherein the rods are configured from glass fiber or light metal.

8. The air guide according to claim 6,
wherein the reinforcement elements are adjusted mainly in the direction of the air outlet opening to the air inlet opening or transversely to that.

9. The air guide according to claim 6,
wherein the reinforcement elements are at least exchangeable or solidly fixed in the material.

10. The air guide according to claim 1,
wherein the air guide body comprises attachment elements in order to assemble the air guide at the vehicle in a form or a force fitting manner.

11. The air guide according to claim 10,
wherein the attachment elements are connected with the material in a form or force fitting and/or material bonded manner or are integrated in the material.

12. The air guide according to claim 10,
wherein the attachment elements are configured in form of plastic frames which at least partially define the air inlet opening and the air outlet opening.

13. The air guide according to claim 10,
wherein the attachment elements are at least configured in form of latching or clip elements or in form of hooks.

14. Method for mounting an air guide according to claim 1 at a cooling module of a front-end module of a vehicle comprising the following steps:
transfer of the air guide from the transport state into the mounting state wherein the air guide assumes a significantly greater volume in the mounting state than in the transport state,
mounting of the air guide at least at the front-end module or at the cooling module,
wherein the steps can be performed in any order.

15. Use of a material for an air guide,
wherein the material is configured in way that the air guide can be reversibly transferred in a mounting state and in a transport state, wherein the air guide assumes a significantly greater volume in the mounting state than in the transport state.

16. Front-end module of a vehicle with an air guide according to claim 1 which can be mounted to a front-end module of a vehicle according to a method comprising the following steps:
transferring the air guide from the transport state into the mounting state wherein the air guide assumes a significantly greater volume in the mounting state than in the transport state,
mounting of the air guide at least at the front-end module or at the cooling module,
wherein the steps can be performed in any order.

17. The air guide according to claim 3,
wherein the material is configured from polyester, polyamide, polyimide, polyethylene, polypropylene, elastane, or nylon.

18. The air guide according to claim 4,
wherein the material is configured from cotton, linen, viscose, modal, or rubber.

* * * * *